United States Patent Office 3,455,691
Patented July 15, 1969

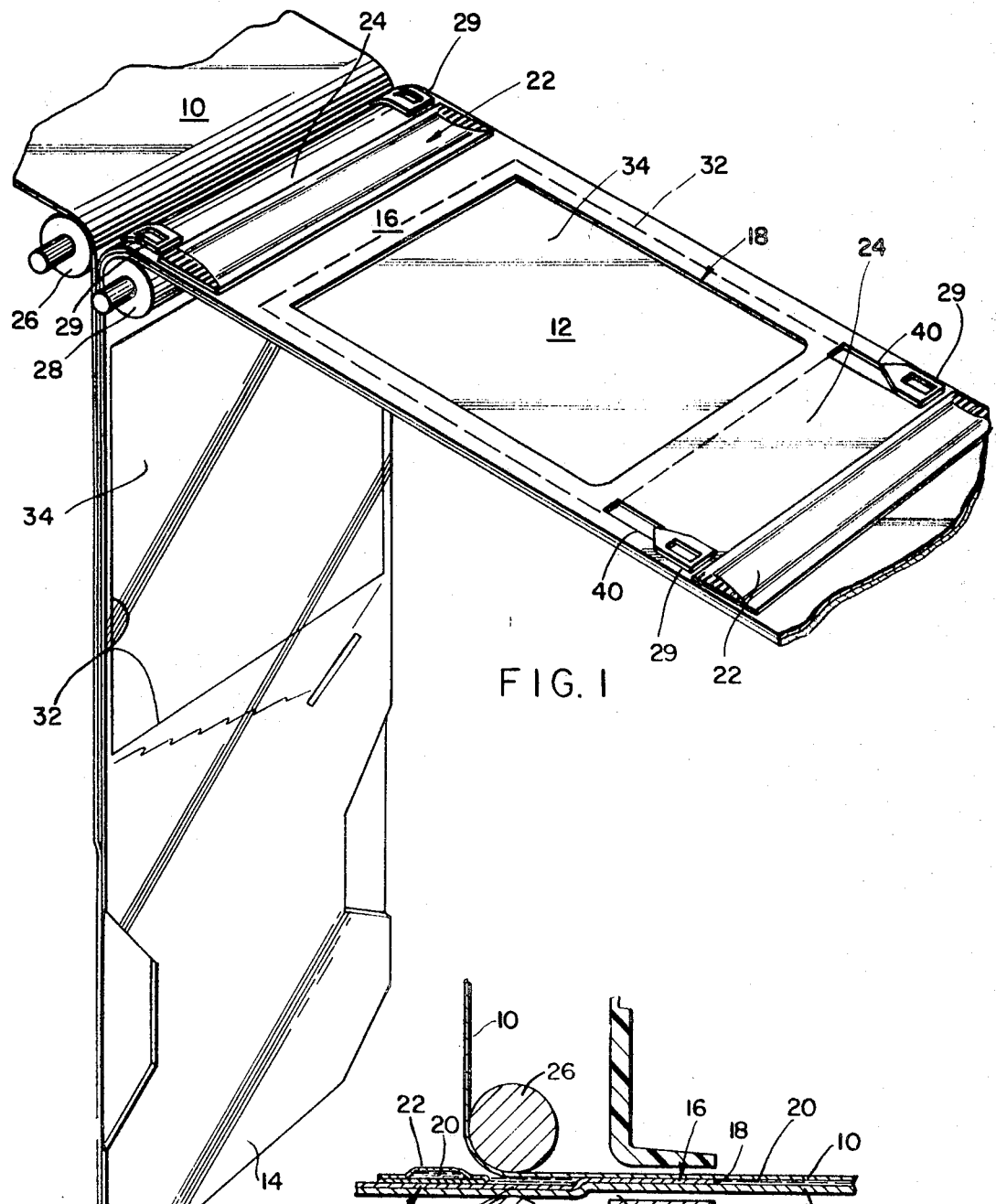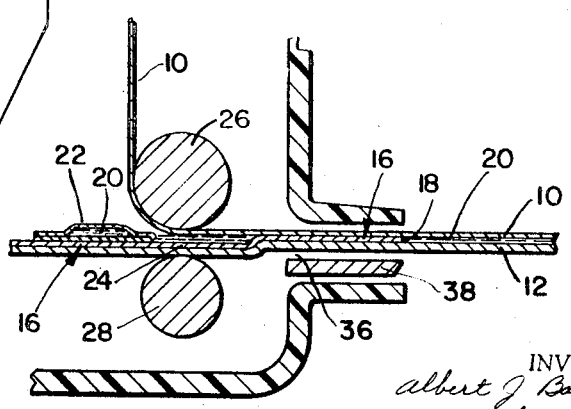

3,455,691
PHOTOGRAPHIC FILM ASSEMBLY AND PROCESS
Albert J. Bachelder, Lexington, and John E. Donovan, Quincy, Mass., assignors to Polaroid Corporation, Cambridge, Mass., a corporation of Delaware
Filed Feb. 4, 1965, Ser. No. 430,291
Int. Cl. G03c 1/48
U.S. Cl. 96—76                15 Claims

ABSTRACT OF THE DISCLOSURE

A self-developing photographic film assemblage and a photographic method employing the film assemblage in which the latter is processed by moving it between a pair of pressure-applying members for distributing a processing liquid within the film assemblage. One of the pressure-applying members includes raised sections near its ends for engaging the film assemblage adjacent its lateral edges to space apart the medial sections of the members and control and thickness of the layer of liquid distributed within the film assemblage. The film assemblage includes a photosensitive sheet, a second sheet and a mask sheet secured to the second sheet, the sheets being coupled for superpositioning of an exposed area of the photosensitive sheet with an image-receptive area of the second sheet. Trapping elements are mounted on the mask sheet adjacent the trailing edge of the areas in which an image is formed for spacing the pressure-applying members apart to trap and retain excess processing liquid between the sheets, and the mask sheet is formed with openings located near the lateral edges of the sheets between the areas and the trapping elements and in alignment with the raised sections of the pressure-applying member for reducing the gap between the pressure-applying members and hence the thickness of the layer of liquid, in order to laminate the sheets together more securely. The sheets may be severed in this region of the reduced liquid thickness without danger of leakage or exposing the photosensitive sheet to light admitted between the sheets.

This invention relates to photographic roll film assemblies for use in a photographic transfer process and methods employing the roll film assemblies; and particularly to a novel and improved roll film assembly including image-recording and image-receiving sheets adapted to be superposed and processed by a liquid distributed between the superposed sheets and a method of using the roll film assembly.

The familiar and well-known "Polaroid Land picture roll" generally comprises an elongated photosensitive image-recording sheet, an image-receiving sheet coupled at its leading end with the image-recording sheet, a mask sheet secured to the image-receiving sheet and a succession of rupturable containers of processing liquid mounted in spaced relation on the mask sheet. The equally familiar and well-known Polaroid Land camera in which this roll film assembly is employed includes means for exposing successive frames of the image-recording sheet, superposing them with areas of the image-receiving sheet and distributing the processing liquid from one of the containers between each superposed frame and area of the sheets to form a sandwich. The camera (or similar apparatus) usually includes a lighttight processing chamber into which the sandwich comprising the superposed frame and area is advanced and remains during a processing period at the end of which a positive transfer print including the area of the image-recording sheet is removed from the processing chamber.

Objects of the invention are: to provide a photographic roll film assembly of the type described designed to permit the sandwich comprising a superposed frame and area of the image-recording and image-receiving sheets to be moved directly into the light during processing; to provide a roll film assemblage as described which permits the sandwich comprising a superposed frame and area of the image-recording and image-receiving sheets to be torn from the remainder of the sheets within the apparatus in which the sheets are superposed and the processing liquid distributed therebetween; and to provide a method of photography of the type described in which successive portions of the sandwich comprising the superposed sheets are withdrawn from the camera into the light and are severed from the remainder of the sandwich without exposing the photosensitive material.

Other objects of the invention will in part be obvious and will in part appear hereinafter.

The invention accordingly comprises the product possessing the features, properties and the relation of components, and the process involving the several steps and the relation and order of one or more of such steps with respect to each of the others which are exemplified in the following detailed disclosure, and the scope of the application of which will be indicated in the claims.

For a fuller understanding of the nature and objects of the invention, reference should be had to the following detailed description taken in connection with the accompanying drawings wherein:

FIGURE 1 is a perspective view of a film assemblage embodying the invention;

FIG. 2 is a fragmentary perspective view showing a portion of the film assemblage and the camera in which it is employed.

Figure 3:
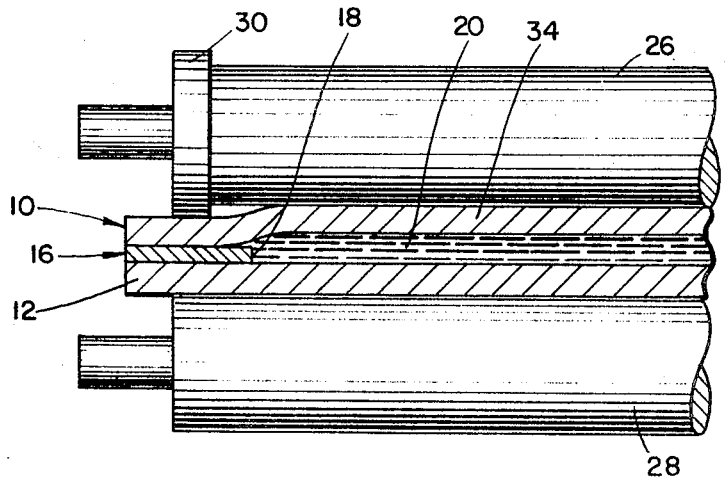
FIGS. 3 and 4 are sectional views showing the manner in which the film assemblage is employed.
Figure 4:
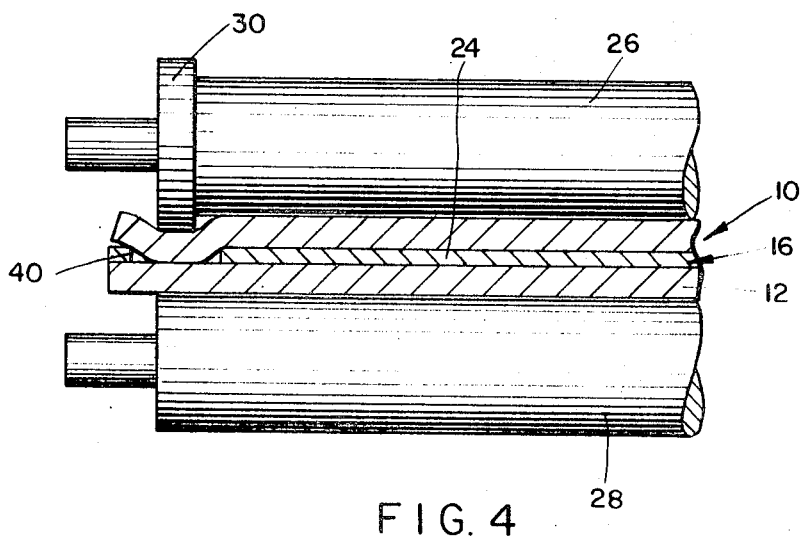

The roll film assemblage of the invention generally comprises an elongated photosensitive image-recording sheet including a succession of areas or frames adapted to be exposed to actinic light to form an image therein. The photosensitive sheet comprises a support formed, for example, of paper or a plastic such as cellulose acetate, and a photosensitive layer on one side including, for example, a gelatino silver halide emulsion. The second or image-receiving sheet is also flexible and elongated being approximately coextensive in size with the image-recording sheet and comprising a support formed, for example, of paper or a plastic such as cellulose acetate, and having a surface which functions as a support for an image comprising image-forming substances transferred by diffusion from the image-recording sheet. A mask sheet, preferably formed of a thin paper such as tissue paper, is substantially coextensive with the image-receiving sheet, is adhered in superposed relation to the side of the image-receiving sheet adapted to support the transfer image and is formed with a succession of spaced, generally rectangular openings corresponding in size and shape to the exposure frames of the image-recording sheet.

The image-recording and image-receiving sheets are secured to one another at their leading ends with the photosensitive side of the image-recording sheet facing the image-receptive side of the image-receiving sheet, and with the openings in the mask substantially registered with the exposure frames of the image-recording sheet. A plurality of rupturable containers or pods of a viscous processing agent are mounted in spaced relation on the mask sheet intermediate successive openings therein with each container positioned to release its liquid contents for distribution between and in contact with the image-receiving and mask sheets and the image-recording sheet. The film assembly is usually supplied initially with the image-recording sheet coiled around a spool or similar device and the image-receiving and mask sheets coiled in a separate coil. In employing the film assemblage, each frame of the image-recording sheet is exposed and advanced into superposition with a portion of the image-receiving sheet and mask sheet, and the processing liquid is distributed from a container mounted on the mask sheet adjacent the leading edge of the aperture toward the trailing edge of the aperture between the mask and image-recording sheets and the image-receiving and image-recording sheets. The processing liquid includes a thickening or film-forming agent which adheres the mask sheet and image-receiving sheet to the image-recording sheet to form a sandwich which, heretofore, has been retained in a light-free environment during a processing period of predetermined duration at the end of which the image-receiving sheet containing the transfer image is separated from the image-recording sheet and mask sheet. To facilitate this and form a finished photographic print, the image-receiving sheet is perforated at the borders of a rectangular area to provide a tear-out section slightly larger than the opening in the mask and located concentrically with respect to the opening which may be separated from the remainder of the image-receiving sheet and the image-recording and mask sheets laminated therewith.

The image-receiving and mask sheets are also provided with spacing elements or traps which function to separate the pressure-applying members which spread the processing liquid in order to trap and retain excess processing liquid at the end of each frame and area so that it is not spread into contact with the next succeeding frame and area; and indexing members for controlling the step-by-step movement of the sheets through the apparatus during exposure and processing of successive frames. The indexing members usually take the form of a pair of openings in the lateral margins of the image-recording sheet for each print area thereof and these openings may, as a rule, be reinforced by the spacing or trapping members.

The film assemblage of the invention, while being basically of the type described, is specially designed and constructed to be employed in photographic processing apparatus such as a camera in which the sandwich comprising a superposed frame and area of the image-recording and image-receiving sheets is withdrawn as it is formed directly from the apparatus into the light, rather than into a lighttight processing chamber within the apparatus; and this film unit is further designed to be employed with a camera such as is shown and described in the copending U.S. patent application of Vaito K. Eloranta, Ser. No. 409,248, now patent No. 3,289,560 filed Nov. 5, 1964, including means against which the sandwich is drawn for tearing or severing the sandwich from the remainder of the sheets within the camera. Of course, withdrawing the sandwich from the camera directly into the light and tearing the sandwich from the remainder of the sheets to leave a leader by which the sheets may be grasped for withdrawing the next successive frame and area from the camera presents a number of problems which are not encountered when each frame and area are processed within a lighttight chamber within the camera. The most obvious problem is that of preventing exposure of the image-recording sheet during processing outside of the camera, while other problems involve adhering or laminating the sheets to one another so that they remain in proper registration during and following tearing and trapping and retaining excess processing liquid between successive pairs of frames and areas at which the sheets are torn in such a way that the processing liquid does not come into contact with the operator's hands.

Reference is now made to the drawings wherein there is illustrated a photographic film assemblage embodying the invention comprising an elongated photosensitive image-recording sheet 10 coupled at its leading end to an image-receiving sheet 12 to form a short leader 14.

The image-recording sheet, as noted, may comprise a support formed, for example, of baryta paper on one side of which is coated a layer of a light-sensitive image-recording material such as a gelatino silver halide emulsion. Image-receiving sheet 12 is approximately equal in width and length to the image-recording sheet and comprises a support such as baryta paper on one side of which is provided a coating (e.g., containing silver precipitating nuclei) for supporting a transfer image formed, for example, from undeveloped silver halide of the image-recording sheet. The image-recording sheet is sufficiently long to provide a succession of spaced rectangular areas or frames adapted to be exposed to actinic light to form images therein. Since the sandwich comprising the two sheets is to be withdrawn from the apparatus directly into the light, both the image-recording and image-receiving sheets are formed of or provided with a coating or layer of a material which renders the sheets opaque to actinic light.

An elongated mask sheet 16 formed of a thin material such as tissue paper and approximately equal in length and width to the image-receiving sheet is secured to the side of the image-receiving sheet on which the transfer image is formed and which faces the image-recording sheet. Mask sheet 16 is formed with a plurality of spaced rectangular openings or apertures 18 which define the picture or print areas and are registered with the exposure frames of the image-recording sheet. The mask sheet is adhered to the image-recording sheet by a strippable and preferably water-soluble adhesive about which more will be said infra.

The processing liquid, designated 20, for each frame and area is provided in a rupturable container 22 formed of a rectangular blank of liquid and gas impermeable sheet material folded lengthwise and secured to itself at its longitudinal and end edges to form a cavity filled with the liquid. Each container is mounted on a section 24 of mask sheet 16 intermediate successive apertures 18 near the leading edge of the aperture in position for the liquid contents of the container to be dispensed therefrom in the direction of the opening 18 in response to the application of compressive pressure to the container through the superposed sheets. The processing liquid, in a preferred embodiment, includes an aqueous alkaline solution of a silver halide developer, a silver halide complexing agent and a thickening or film-forming agent such as sodium carboxymethyl cellulose, which facilitates dispensing and distribution of the processing liquid and adherence of the sheets to one another to form a sandwich when the liquid is distributed between and in contact with the sheets. The processing liquid is distributed between an exposed frame of the image-recording sheet and a corresponding area of the photosensitive sheet by moving the sheets in superposition relative to and between a pair of juxtaposed pressure-applying members shown as rolls 26 and 28, to apply compressive pressure to the sheets and container progressively commencing in the region of the container and continuing toward the trailing end of the pressure area defined by aperture 18. Excess liquid is trapped between the mask and image-recording sheets by trapping members 29 mounted on the mask sheet.

Mask sheet 16 functions to prevent diffusion-transfer of image-forming substances in areas of the image-receiving sheet where no image is desired, and also cooperates with the other sheets and pressure-applying rolls to provide for spreading of the processing liquid in a layer of predetermined thickness. In the preferred form, roll 28 is substantially cylindrical throughout a length at least equal to the width of the image-receiving sheet, and roll 26 includes a cylindrical medial portion at least equal in length to the width of openings 18 and raised collars or portions 30 of enlarged diameter near its ends adapted to bear against the lateral margins of the photosensitive or image-receiving sheet. Collars 30 cooperate with the sheets to space apart the medial portions of the rolls to provide a space between the image-recording and image-receiving sheets of predetermined depth within which the processing liquid is spread as a layer of predetermined thickness as shown in FIG. 3; and the portions of the mask sheet at the lateral margins of openings 18 also cooperate with the collars in achieving this result. The radial height of each of collars 30 is quite small, being of the order of a few thousandths of an inch, and may be approximately equal to the thickness of the mask sheet, so that the thickness of the layer of processing liquid distributed within an opening 18 between image-recording and image-receiving sheets is determined primarily by the combination of the height of the collar and the thickness of the mask sheet. The processing liquid is of course distributed between the mask sheet and the image-recording sheet and in this area, the layer of liquid is substantially thinner than between the image-recording and image-receiving sheets and functions to laminate the mask to the image-recording sheet so that sections of the image-receiving sheet, each containing a transfer print, may be separated from the image-recording sheet and the mask sheet, containers and other components mounted on the mask sheet. To further this result, the adhesive bond between the mask and image-receiving sheet is weaker than the bond between the mask sheet and the image-recording sheet laminated therewith by the liquid.

To provide for a succession of finished rectangular photographic prints, the image-receiving sheet is perforated along lines, designated 32, underlying the mask sheet and bordering openings 18 to form a plurality of tear-out sections 34 each including an area defined by an opening 18 in mask sheet 16, which can be separated with facility from the remainder of the image-receiving sheet which, in the preferred embodiment of the product, remains laminated with the mask sheet and image-recording sheet following processing and stripping of the tear-out section. The camera or other processing apparatus with which the film unit is employed, partially shown in FIG. 2, includes a housing having a passage 36 through which successive sections of the sandwich are withdrawn from between rolls 26 and 28 into the light and an edge or cutting member 38 against which the sandwich is torn along a transverse line preferably at or very close to the transverse line 32 of perforations at the trailing end of each print. In the operation of the apparatus, cutting member 38 is moved inwardly to permit the operator to grasp leader 14 or a portion of the sandwich intermediate successive frames and areas for withdrawing a portion of the sandwich including a container and superposed frame and area between the pressure-applying rolls through passage 36 from the camera. The processing liquid distributed between the sheets functions to laminate the sheets to one another and since they are opaque, exposure of the photosensitive sheet to ambient light is prevented. It has been discovered that the strength of this lamination is to a large extent inversely proportional to the pressure applied to the sheets and the thickness of the layer of processing liquid distributed therebetween, and for this reason, is quite strong at the lateral margins of the sheets and is comparatively weak at the ends of each sandwich. It is particularly important that the lamination be strong at the leading end of each sandwich where the sheets are grasped to withdraw them from the camera in order to preclude slippage of the sheets with respect to one another resulting in possible misalignment or movement of only one of the sheets. It is important that the lamination be strong in the region of sections 24 of the mask sheet intermediate apertures 18, because it is in these sections that the sheets are torn and the greatest stress is placed on the lamination tending to cause the sheets to separate and/or slip with respect to one another.

To provide for the strongest possible lamination between the three sheets between successive openings 18 near the trailing end of each opening where the sandwich is torn, mask sheet 16 is provided with relatively small lateral openings or apertures 40 located near the margins of the sheets for reducing the thickness of the mask sheet in the region of collars 30. Each of lateral openings 40 is generally rectangular in shape, has a width equal to the axial length of collar 30, has an inside edge approximately aligned with a lateral edge of an opening 18 and a leading edge located approximately in alignment with the trailing edge of a tear-out section 34 at a transverse perforation line 32. Each pair of lateral openings 40 permits the cylindrical medial portions of rolls 26 and 28 to come together so that there is substantially little or no gap between the mask sheet and the image-recording sheet in the region between openings 40, thereby effectively and securely laminating the mask sheet to the image-recording sheet in this region. This construction permits the operator to grasp the leading edge portions of the sandwich in a region thereof in which the three sheets are securely laminated to one another without fear of the liquid being squeezed from between the sheets where it would contact the operator's hands, clothing and the like, and insures that there is no appreciable amount of processing liquid between the sheets which might otherwise cause the sheets to become misaligned or move relative to one another.

Since certain changes may be made in the above product and process without departing from the scope of the invention herein involved, it is intended that all matter contained in the above description or shown in the accompanying drawings shall be interpreted as illustrative and not in a limiting sense.

What is claimed is:
1. In a method of treating an exposed frame of an image-recording sheet by superposing said frame with an area of a second sheet and moving said superposed sheets including said frame and said area and a rupturable container of processing liquid secured to at least one of said sheets adjacent the leading edges of said frame and area, between a pair of juxtaposed pressure-applying members for spreading said processing liquid between said frame and area toward the trailing ends of said sheets, the steps of:
   spacing at least the medial portions of said pressure-applying members a predetermined distance apart from one another during movement of said frame and area between said members to spread said liquid in a thin layer therebetween and provide a space between said frame and area for containing a thin layer of said processing liquid;
   pressing said sheets together into face-to-face contact in a transverse region of said sheets immediately adjacent the trailing edges of said frame and area to squeeze substantially all of said processing liquid from between said sheets in said transverse region; and
   spreading any excess of said processing liquid toward said trailing ends of said sheets beyond said transverse region and collecting said excess processing liquid in a trapping region bounded by a surface of at least one of said sheets.

2. A photographic method as defined in claim 1 wherein said superposed sheets including said frame and area are advanced from between said pressure-applying members directly into the light.

3. A photographic film assemblage comprising, in combination:
   a light-sensitive, image-recording sheet including a first section having an area capable of forming an image when exposed to actinic light and a second section adjacent said first section;
   an image-receiving sheet having first and second sections substantially coextensive with, respectively, said first and second sections of said image-recording sheet, at least said first section of said image-receiving sheet including an area for supporting an image comprising image-forming substances transferred from said exposed area of said image-recording sheet; said sheets being connected to one another for alignment of said first and second sections when said sheets are superposed;

a mask sheet including first and second sections substantially coextensive with said first and second sections of said image-receiving sheet secured in face-to-face relation to the latter, said mask sheet including a medial opening in said first section thereof generally coextensive with said area of said image-receiving sheet; and trapping elements mounted on said second section of said mask sheet near the lateral margins of said mask sheet for spacing apart a pair of pressure-applying members during movement of said assemblage between said members;

said second section of said mask sheet being formed with lateral openings located adjacent the lateral edges of said mask sheet between said medial opening and said trapping elements.

4. A photographic film assemblage as defined in claim 3 wherein said medial opening is substantially rectangular and said lateral openings include longitudinal edges disposed substantially in alignment with the longitudinal edges of said medial opening.

5. A photographic film assemblage as defined in claim 3 wherein said image-recording, image-receiving and mask sheets are elongated, include a succession of said first and second sections and are joined to one another near their leading ends ahead of the first of said first sections.

6. A photographic film assemblage as defined in claim 5 wherein said medial openings are substantially rectangular, said image-receiving sheet is perforated along lines located in generally parallel relation with the edges of each of said medial openings outside of said medial openings to provide a rectangular tear-out section larger than said medial opening and each of said lateral openings extends from the trailing edge of each of said tear-out sections toward the leading edge of the next succeeding tear-out section.

7. A photographic film assemblage as defined in claim 5 wherein said image-recording and image-receiving sheets are opaque to actinic light, and a rupturable container of a liquid including a thickening agent is mounted on each of said second sections of said mask sheet in position to release said liquid for distribution between said image-recording sheet and said mask and image-receiving sheets.

8. A photographic image-receiving sheet assembly for use in a photographic transfer process to produce a plurality of photographic prints comprising, in combination:

an elongated flexible image-receiving sheet for supporting a succession of transfer images;

a flexible mask sheet substantially coextensive with and secured in superposed relation to one side of said image-receiving sheet;

said mask sheet being formed with a plurality of spaced medial openings defining picture areas of said image-receiving sheet and including sections intermediate said medial openings each formed with a pair of relatively small lateral openings located adjacent the lateral edges of said mask sheet and the trailing end of one of said medial openings; and a pair of trapping elements mounted on each of said sections adjacent the lateral edges thereof between said lateral openings and the leading edge of the next succeeding medial opening.

9. A photographic image-receiving sheet assembly as defined in claim 8 wherein said medial openings are substantially rectangular and said lateral openings include opposed longitudinal edges disposed substantially in alignment with the longitudinal edges of said medial openings.

10. A photographic image-receiving sheet assembly as defined in claim 8 wherein said medial openings are substantially rectangular, said image-receiving sheet is perforated along lines located in generally parallel relation with the edges of each of said medial openings to provide a rectangular tear-out section larger than said each medial opening, and each of said lateral openings extends from the trailing edge of each of said tear-out sections toward the leading edge of the next succeeding tear-out section.

11. A photographic image-receiving sheet assembly as defined in claim 8 wherein a rupturable container of a liquid including a thickening agent is mounted on each of said sections of said mask sheet in position to release its liquid contents for distribution in contact with said mask sheet and said image-receiving sheet within one of said medial openings, and said image-receiving and mask sheets comprise paper.

12. In a method of treating an exposed frame of an image-recording sheet by superposing said frame with an area of a second sheet and moving said superposed sheets including said frame and said area and a rupturable container of processing liquid located between said sheets adjacent the leading edges of said frame and area, between a pair of juxtaposed pressure-applying members for distributing said processing liquid between said frame and area, the steps of:

spacing at least the medial portions of said pressure-applying members a predetermined distance apart from one another during movement of said frame and area between said members to distribute said liquid in a thin layer between said frame and area; and reducing the spacing between said medial portions of said members during movement therebetween of potrions of said sheets adjacent the trailing edges of said frame and area to substantially reduce the thickness of the layer of said liquid distributed between said portions of said sheet.

13. A photographic method as defined in claim 12 wherein said superposed sheets including said one frame and area are advanced from between said pressure-applying members directly into the light.

14. A photographic method as defined in claim 13 wherein said superposed sheets are severed along a transverse line at the last-mentioned portions of said sheets.

15. A method as defined in claim 12 including the additional step, performed after movement of a predetermined length of said portions of said sheets between said members, of increasing the spacing between said medial portions of said members to provide a space between other portions of said sheets for collecting and retaining excess processing liquid.

References Cited

UNITED STATES PATENTS 2,543,181  2/1951  Land _____ 96—29 XR
2,698,243  12/1954 Bachelder et al. ____ 92—29 XR NORMAN G. TORCHIN, Primary Examiner J. P. BRAMMER, Assistant Examiner